United States Patent [19]
Sakamoto et al.

[11] Patent Number: 6,153,334
[45] Date of Patent: Nov. 28, 2000

[54] ACTIVE MATERIALS FOR THE POSITIVE ELECTRODE IN ALKALINE STORAGE BATTERY AND THE MANUFACTURING METHOD OF THEM

[75] Inventors: Hiroyuki Sakamoto; Hidekatsu Izumi, both of Neyagawa; Yoichi Izumi, Moriguchi; Isao Matsumoto, Osaka, all of Japan

[73] Assignee: Matsushita Electric Industrial Co., Ltd., Osaka, Japan

[21] Appl. No.: 09/129,956

[22] Filed: Aug. 6, 1998

[30] Foreign Application Priority Data

Mar. 5, 1998 [JP] Japan .................................. 10-053225

[51] Int. Cl.⁷ .............................. H01M 4/32; C01G 1/00
[52] U.S. Cl. ..................... 429/223; 429/224; 29/623.1; 428/545; 423/138; 423/599; 252/518
[58] Field of Search ..................... 429/223, 224, 429/218.1; 29/623.1; 428/545; 423/140, 599, 138; 501/127; 252/518

[56] References Cited

U.S. PATENT DOCUMENTS

| | | | |
|---|---|---|---|
| 4,251,603 | 2/1981 | Matsumoto et al. | 429/94 |
| 5,348,822 | 9/1994 | Ovshinsky et al. | 429/223 |
| 5,366,831 | 11/1994 | Watada et al. | 429/223 |
| 5,569,562 | 6/1997 | Glemser et al. | 429/223 |
| 5,635,313 | 9/1997 | Abe | 429/223 |
| 5,637,423 | 6/1997 | Ovshinsky et al. | 429/223 |
| 5,670,271 | 9/1997 | Axmann | 429/59 |
| 5,905,003 | 5/1999 | Young et al. | 429/223 |
| 5,965,295 | 10/1999 | Bando et al. | 429/223 |

FOREIGN PATENT DOCUMENTS

| | | |
|---|---|---|
| 51-122737 | 10/1976 | Japan . |
| 6137733 | 2/1980 | Japan . |
| 6254235 | 8/1981 | Japan . |
| 480513 | 7/1985 | Japan . |
| 4179056 | 6/1992 | Japan . |
| 541212 | 2/1993 | Japan . |
| 8222215 | 8/1996 | Japan . |
| 8222216 | 8/1996 | Japan . |
| 8225328 | 9/1996 | Japan . |
| 9115543 | 5/1997 | Japan . |

*Primary Examiner*—Maria Nuzzolillo
*Assistant Examiner*—Raymond Alejandro
*Attorney, Agent, or Firm*—Stevens, Davis, Miller & Mosher, L.L.P.

[57] ABSTRACT

The energy density of active materials for a positive electrode comprising an oxide containing Ni as a main metallic element is enhanced, and, moreover, a method for manufacturing them is provided. The oxide includes Ni as a main metallic element and contains at least Mn in the state of solid solution or eutectic mixture, wherein the average valence of Mn is 3.3 valences or more, the tap density is 1.7 g/cc or more, the half width of a peak at around $2\theta=37-40°$ of X-ray diffraction using CuKα ray is 1.2 deg or less, the ratio B/A of integrated intensity B of a peak at around $2\theta=18-21°$ to integrated intensity A of a peak at around $2\theta=37-40°$ is 1.25 or less, and the volume of pores having a pore radius of 40 Å or less is 60% or more of the total pore volume. The oxide is obtained by growing in the state of keeping the dissolved oxygen concentration in the aqueous solution in the reaction vessel and then oxidizing the oxide.

38 Claims, 6 Drawing Sheets

ENLARGED PORTION A

ACTIVE MATERIALS FOR THE POSITIVE ELECTRODE IN ALKALINE STORAGE BATTERY AND THE MANUFACTURING METHOD OF THEM

BACKGROUND OF THE INVENTION

1. Field of the Invention

The present invention relates to active materials for the positive electrode in an alkaline storage battery which are mainly composed of a metal oxide containing Ni as a main metallic element, and which are high in capacity, and a manufacturing method therefor.

2. Description of the Related Art

With the recent progress of semiconductor techniques, miniaturization, weight-saving and multi-functionation of electronic apparatuses have advanced and personalization of small-sized portable equipment represented by portable telephone, notebook type personal computer or the like is rapidly progressed. Therefore, demand for miniaturization and weight-saving of alkaline storage batteries which are widely employed as electric sources of them is increased.

Up to now, nickel oxide (NiOOH) has been used as the main active material for positive electrode in alkaline storage batteries while in place of sintered type electrodes using conventional sintered substrate there has been industrialized foamed metal type electrodes comprising a three-dimensional foamed nickel porous body of higher porosity (about 95%) and nickel oxide powders filled in the nickel porous body at high density (see, for example, JP-B-62-54235 and U.S. Pat. No. 4,251,603), whereby energy density of nickel positive electrodes has been markedly increased.

For the increase in energy density of nickel positive electrodes, improvement of manufacturing method of nickel oxide powder which is an active material is also one of important techniques. Conventional manufacturing method of nickel oxide powder comprises reacting an aqueous alkaline solution such as sodium hydroxide with an aqueous solution of a nickel salt to produce a precipitate, then aging it to grow crystal, and thereafter grinding the crystal by a mechanical method. However, this method is troublesome and besides since the resulting powders are irregular shape, a high packing density can hardly be obtained. However, as shown in JP-B-4-80513, another method has been proposed which comprises reacting an aqueous solution of a nickel salt with ammonia to form an ammonium complex of nickel and growing nickel hydroxide in an aqueous alkaline solution. According to this method, continuous production becomes possible, resulting in reduction of cost and furthermore since the resulting powders are close to spherical in shape high density packing becomes possible.

However, since high density particles of large size growing to several ten μm are used as the active material, charge and discharge efficiency deteriorates owing to the decrease of electronic conductivity of the active material per se. For the solution of this problem, the electronic conductivity is supplemented by adding Co or oxides thereof and Ni (JP-B-61-37733, "Denki Kagaku", Vol. 54, No. 2, p. 159 (1986), "Power Sources", 12, p 203 (1988)), and, furthermore, improvement of charge and discharge efficiency is attempted by dissolving metallic elements such as Co other than Ni in the active material to form a solid solution.

Moreover, as the attempt to improve charge and discharge efficiency by dissolving different metallic elements in crystals as mentioned above, a method of adding Cd or Co in the active material to form a solid solution (e.g., JP-B-3-26903, JP-B-3-50384, "Denki Kagaku", Vol. 54, No. 2, p. 164 (1986), "Power Sources", 12, p 203 (1988)) is employed, but from the environmental viewpoint, batteries free of cadmium are desired, and Zn is proposed as one example of metallic elements substituted for cadmium and, moreover, a solid solution of three elements such as Co, Zn and Ba is proposed (U.S. Pat. No. 5,366,831). The dissolution of different metals to a nickel oxide in the form of solid solution for the purpose of enhancement of efficiency of charge-discharge efficiency is an old technique and is known in JP-A-51-122737.

Energy density of positive electrode has been markedly increased by the above-mentioned improvement in structure of substrates, shape of active material particles, composition of active material and additives thereto, and, at present, positive electrodes of about 600 mAh/cc in energy density are put to practical use. However, improvement of energy density as electric source for small-sized portable equipment is being increasingly demanded. In order to attain improvement of energy density of batteries, an approach is considered on positive and negative electrodes, electrolyte, separator or construction of them. As for negative electrode, a volume energy density more than twice that of positive electrode has been obtained by the practical use of metal hydrides of high energy density in place of conventional cadmium negative electrodes ("Power Sources", 12, p. 393 (1988)). With respect to construction of batteries, rapid increase of energy density has been made by the technical progresses such as reduction in thickness of separator and packing of active materials in electrode plates at high density, and, at present, the increase of energy density reaches nearly a limit. For the realization of further improvement of energy density, it is important as the most effective technique to further increase energy density of positive electrode which occupies nearly a half of volume in a battery.

In order to improve energy density of positive electrode, there can be considered approaches to improve packing density of electrode such as improvement of tap density of active material, reduction of the amount of additives, and reduction of amount of metal in the foamed nickel substrate, but these techniques reach nearly a limit. Therefore, it is necessary to attempt improvement in reactivity and order of reaction by improving the active material per se. It is said that a nickel oxide which is an active material for positive electrode at present is a β-type $Ni(OH)_2$ (divalent oxide) at packing and one-electron reaction (utilization factor: 100%) with a β-type NiOOH (trivalent) proceeds at usual charge and discharge. However, a part of this β-NiOOH in charged state is oxidized to γ-NiOOH which is an oxide of higher valence (3.5–3.8 valences) by overcharge. It is known that at least γ-NiOOH is a non-stoichiometric material and is crystallographically disorder ("J. Power Sources", 8, p 229 (1982)). Hitherto, an attempt has been made to inhibit production of γ-NiOOH because this is electrochemically inactive and causes various problems such as voltage drop or capacity decrease and, in addition, insufficient contact with conductive agent, substrate and others due to volume expansion of electrode resulting from interlaminar extension, falling off of active material, and exhaustion of electrolyte due to inclusion of water molecule.

However, for the further increase of energy density using an active material comprising a nickel oxide as a base, it is very important to properly utilize γ-NiOOH which is an oxide of higher valence. For this purpose, materials have been proposed which have a structure close to α type hydroxide including anion and water molecule between layers and which are prepared by dissolving different metals such as Mn (III), Al (III), and Fe (III) in the state of solid solution in place of a part of Ni ("Solid State Ionics", 32/33, p. 104 (1989), "J. Power Sources", 35, p. 249(1991), U.S. Pat. Nos. 5,348,822(1994) and 5,569,562(1996), JP-A-8-225328)). It is said that charge and discharge reactions easily proceed between these oxides and the oxides of higher valence having a structure similar to that of γ-NiOOH. However, it is considered that actually these oxides have wide interlaminar space resulting in very high bulkiness, and, hence, high density packing is difficult and they are poor in utility.

On the other hand, the inventors have paid attention to active materials which have a β-type crystal structure at the time of packing in electrode and undergo charge and discharge reaction with γ-NiOOH which is an oxide of higher valence. As one example, we have proposed modification of nickel oxides by the dissolution of a different metal in solid state for attaining high density and higher reaction. Furthermore, we have proposed that a composition mainly composed of Mn is especially hopeful as the different metal to be dissolved (e.g., JP-A-8-222215, JP-A-8-222216 and JP-A-9-115543). These disclose that mobility of proton and electronic conductivity are improved and utilization factor is increased by dissolving Mn in a nickel oxide in the state of solid solution. Nickel oxides in which Mn is dissolved in the state of solid solution are proposed in JP-A-51-122737, JP-A-4-179056 and JP-A-41212.

As mentioned above, some attempts have been proposed to modify nickel oxides by dissolving a different metal in solid solution, thereby to improve charge and discharge efficiency. However, in some cases, the effect cannot be sufficiently exhibited depending on the kind of metals to be dissolved and amount of the metals dissolved. On the other hand, in the case of nickel oxides in which Mn is dissolved in solid solution, the effects of improvement in charge and discharge efficiency and order of reaction are considerably great, and improvement in energy density can be expected. However, JP-A-4-179056 and JP-A-5-41212 mainly aim at improvement of cycle life and do not aim at improvement of order of reaction.

Moreover, JP-A-8-222215, JP-A-8-222216 and JP-A-9-115543 do not disclose proper values of valence of Mn, crystal structure and pore distribution which have a great influence on battery characteristics, and further improvement must be performed for attaining the higher energy density. In addition, in preparation of the nickel oxide in which Mn is dissolved to form a solid solution, Mn (II) is unstable and readily oxidized, and it is very difficult to grow the oxide to high density particles. However, none of the above proposals disclose solution of this problem, and realization of high energy density is difficult. Moreover, U.S. Pat. No. 5,637,423 proposes $Ni(OH)_2$ containing Mn, but discloses production of only sintered electrode plates and does not disclose production of powdered metal oxide for attaining high energy density.

SUMMARY OF THE INVENTION

The object of the present invention is to provide active materials for the positive electrode in alkaline storage battery which realize markedly high energy density and are excellent in charge and discharge efficiency and life characteristics.

According to the present invention, properties of nickel oxides containing at least Mn in the state of solid solution or eutectic mixture, namely, average valence of Mn, tap density, peak intensity ratio in X-ray diffraction using CuKα ray and others are properly defined for attaining the above object.

Furthermore, the present invention realizes a method for manufacturing a nickel oxide having the desirable properties as active materials for positive electrode in alkaline storage battery.

Remarkable enhancement of energy density, improvement of cycle stability and improvement of high rate discharge characteristics can be attained by using the above nickel oxide as active materials for the positive electrode in an alkaline storage battery.

DESCRIPTION OF THE PREFERRED EMBODIMENTS

Figure 1:
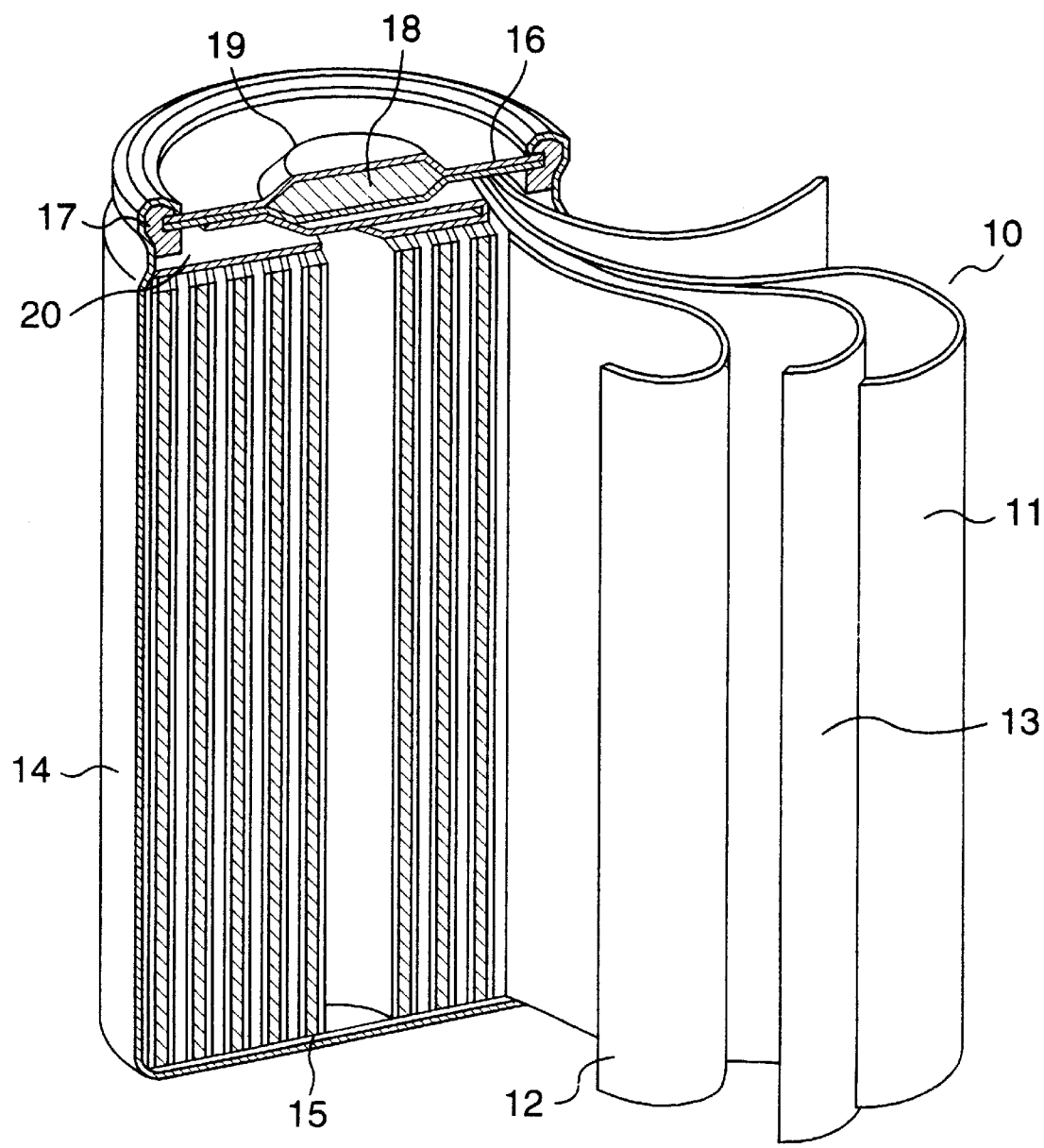
FIG. 1 is an oblique view of a sealed alkaline storage battery in one example of the present invention, shown partly cut away.

Embodiment 1 of the present invention is an active material for positive electrodes in alkaline storage batteries which is mainly composed of a nickel oxide of $\beta-Ni(OH)_2$ type containing at least Mn in the state of solid solution or eutectic mixture, characterized in that the average valence of the Mn is 3.3 valences or more, the tap density is 1.7 g/cc or more, and the half width of a peak at around $2\theta=37-40°$ of X-ray diffraction using CuKα ray is 1.2 deg or less. As the different metal dissolved in the nickel oxide in the state of solid solution, Mn is preferred because of its conspicuous effect for increasing order of reaction. The average valences of Mn is preferably 3.3 or more, and if it is less than 3.3 valences, charge and discharge efficiency in initial cycle is considerably deteriorated due to reduction of electronic conductivity or decrease of γ-phase production efficiency. The tap density is preferably 1.7 g/cc or more, and if it is less than 1.7 g/cc, filling density in electrode decreases and attainment of high energy density is difficult. It is especially preferred that the half width of a peak at around $2\theta=37-40°$ of X-ray diffraction using CuKα ray is 1.2 deg or less. That is, in the case of the half width being small and crystallinity being high, a remarkable improvement of the charge and discharge efficiency can be attained.

The nickel oxide usually means a nickel hydroxide.

Embodiment 2 of the present invention is an active material for positive electrodes in alkaline storage batteries which is mainly composed of a nickel oxide of β-Ni(OH)$_2$ type containing at least Mn in the state of solid solution or eutectic mixture, characterized in that the average valence of the Mn is 3.3 valences or more, the tap density is 1.7 g/cc or more, and the ratio (B/A) of integrated intensity B of a peak at around $2\theta=18-21°$ to integrated intensity A of a peak at around $2\theta=37-40°$ of X-ray diffraction using CuKα ray is 1.25 or less.

If the ratio B/A of peak intensity is 1.25 or less, discharge efficiency of γ phase at the end of cycle is markedly improved and cycle stability is improved, though the reason therefor is not clear.

Embodiment 3 of the present invention is an active material for positive electrodes in alkaline storage batteries which is mainly composed of a nickel oxide of β-Ni(OH)$_2$ type containing at least Mn in the state of solid solution or eutectic mixture, characterized in that the average valence of the Mn is 3.3 valences or more, the tap density is 1.7 g/cc or more, and the volume of pores having a pore radius of 40 Å or less is 60% or more of the total pore volume. The presence of a number of pores (grain boundary between crystals) of 40 Å or less makes it possible to relax the stress caused by expansion and shrinkage of crystal structure. Furthermore, these pores have a great influence on specific surface area, and charge and discharge efficiency at high rate charge and discharge can be considerably improved. Moreover, an excellent effect can be obtained when the proportion is 60% or more of the total pore volume.

Embodiment 4 of the present invention is an active material for positive electrodes in alkaline storage batteries which is mainly composed of a nickel oxide of β-Ni(OH)$_2$ type containing at least Mn in the state of solid solution or eutectic mixture, characterized in that the average valence of the Mn is 3.3 valences or more, the tap density is 1.7 g/cc or more, and the half width of a peak at around $2\theta=37-40°$ of X-ray diffraction using CuKα ray is 1.2 deg or less, the ratio (B/A) of integrated intensity B of a peak at around $2\theta=18-21°$ to integrated intensity A of a peak at around $2\theta=37-40°$ is 1.25 or less, and the volume of pores having a pore radius of 40 Å or less is 60% or more of the total pore volume. The active material of this embodiment is high in density, and charge and discharge efficiency with oxides of high valence is improved, and, thus, a high energy density can be obtained. In addition, improvement of cycle stability and improvement of high rate discharge characteristics can also be attained as mentioned above.

Embodiment 5 of the present invention is characterized in that the content of Mn contained in the state of solid solution or eutectic mixture in the nickel oxide according to the present invention is 1–12 mol % based on the total metallic elements. If the content is less than 1 mol %, the effect is small, and if it is more than 12 mol %, distortion is apt to occur in crystal owing to difference in ionic radius of Ni and Mn, and growth at high density becomes difficult. Therefore, the Mn content is preferably 1–12 mol %.

Embodiment 6 of the present invention is characterized in that the nickel oxide according to the present invention is a powder having spherical shape or a shape similar to the spherical shape. Thus, packing density into an electrode can be improved.

Embodiment 7 of the present invention is characterized in that the nickel oxide comprising Ni as a main metallic element according to the present invention contains at least Al in addition to Ni and Mn. According to the embodiment 1, reaction of higher order of the nickel oxide containing Mn in the state of solid solution proceeds and high density packing becomes possible, and, hence, improvement of energy density can be attained. However, there is still a problem that voltage at discharging is somewhat low. By containing Al in the oxide in the state of solid solution, the discharge voltage can be improved.

Embodiment 8 of the present invention is characterized in that the nickel oxide comprising Ni as a main metallic element according to the present invention contains, in addition to Ni and Mn, at least one element selected from Ca, Mg, Ti, Zn, Sr, Ba, Y, Cd, Co, Cr, rare earth metals and Bi. These metallic elements contained in the state of solid solution have the effects of increasing oxygen evolution overvoltage and improving charge efficiency.

Embodiment 9 of the present invention is characterized in that mainly the surface of powders of the nickel oxide comprising Ni as a main metallic element according to the present invention is covered with a surface layer of a metal oxide or metal having electrical conductivity. According to this embodiment, distribution of a conductive material such as metal oxide or metal becomes more uniform to improve electrical conductivity, and, as a result, it becomes possible to reduce the amount of conductive material. Furthermore, high rate discharge characteristics can be improved due to the improvement of electrical conductivity. Moreover, since the conductive material is uniformly distributed, stability in an aqueous solution is improved and storage characteristics after discharge can be markedly improved.

Embodiment 10 of the present invention is a method for manufacturing an active material for positive electrode in alkaline storage batteries which is mainly composed of a nickel oxide of β-Ni(OH)$_2$ type containing at least Mn in the state of solid solution or eutectic mixture, with an average valence of the Mn of 3.3 valences or more and a tap density of 1.7 g/cc or more, characterized by continuously reacting an aqueous alkaline solution with an aqueous solution of a metal salt containing a Ni salt as a main component and at least an Mn salt, in the state of keeping dissolved oxygen concentration at 5 mg/l or lower in the aqueous solution in a reaction vessel, thereby growing a nickel oxide and then oxidizing the nickel oxide. If the amount of the dissolved oxygen is more than 5 mg/l, oxidation reaction of Mn proceeds in the process of growing of a metal oxide, and due to much decrease in ionic radius of Mn, distortions such as stack-ing irregularity occur in the crystal lattice, and high density growth becomes difficult. By keeping the dissolved oxygen concentration in the reaction vessel at 5 mg/l or lower, oxidation reaction of Mn can be inhibited and high density growth becomes possible. Moreover, by continuously reacting an aqueous solution mainly composed of an Ni salt and containing at least an Mn salt with an aqueous alkaline solution, an oxide in which at least an Mn salt is dissolved to form a solid solution can be grown at a high density. Furthermore, by oxidizing the grown metal oxide powders after they are taken out, the average valence of Mn can be increased to 3.3 or more, and thus an active material having a high density and a high charge and discharge efficiency can be obtained.

Embodiment 11 of the present invention is characterized in that an inert gas and/or a reducing agent are continuously fed to the above-mentioned reaction vessel in the embodiment 10, whereby the dissolved oxygen concentration in the reaction vessel can be decreased and a high density metal oxide powder can be stably taken out.

Embodiment 12 is characterized in that the inert gas in the embodiment 11 is at least one selected from nitrogen, helium and argon. By using these inert gases, the dissolved oxygen concentration in the reaction vessel can be relatively easily reduced, and a high density metal oxide powder can be stably taken out.

Embodiment 13 of the present invention is characterized in that hydrazine is used as the reducing agent in the embodiment 11, whereby oxidation reaction of Mn can be inhibited and a high density metal oxide powder can be easily taken out.

Embodiment 14 of the present invention is characterized in that an aqueous sodium hydroxide solution or an aqueous sodium hydroxide solution containing ammonium ion is used as the above-mentioned aqueous alkaline solution. By continuously reacting this aqueous solution with the aqueous solution mainly composed of an Ni salt and containing at least an Mn salt, the oxide particles can be grown at high density.

Embodiment 15 of the present invention proposes that the oxidation in the manufacturing method of the present invention is carried out by keeping the nickel oxide in the atmosphere, whereby the average valence of Mn in the metal oxide can be easily increased to 3.3 or more.

Embodiment 16 of the present invention is characterized in that the nickel oxide is kept in the atmosphere for at least 1 hour at 20–110° C. in the embodiment 15. If the temperature is lower than 20° C., oxidation reaction of Mn does not proceed sufficiently and the average valence is hard to be increased to 3.3 or more. If the temperature is higher than 110° C., a decomposition reaction of the oxide proceeds to cause deterioration of charge and discharge efficiency. As for the oxidation time, if this is shorter than 1 hour, it is difficult to perform the oxidation up to the inside portion of the metal oxide particles.

Embodiment 17 of the present invention proposes to carry out the oxidation with oxygen or an oxidizing agent, whereby the average valence of Mn in the metal oxide can be increased to 3.3 or more in a short time.

Embodiment 18 of the present invention is characterized in that at least one oxidizing agent selected from hydrogen peroxide and a perchlorate salt is used in the embodiment 17, whereby the average valence of Mn in the metal oxide can be increased to 3.3 or more.

Embodiment 19 is that pH value in the reaction vessel is 11–12.5. If pH is less than 11, it is difficult to dissolve Mn in the state of uniform solid solution. If pH is more than 12.5, agglomerates of fine particles are formed and growth at high density becomes difficult. Furthermore, when pH is 12.5 or less, the half width of a peak at around $2\theta=37–40°$ of X-ray diffraction using CuK$\alpha$ ray can be 1.2 deg or less. Therefore, the pH value is suitably 11–12.5.

Embodiment 20 is one in which the temperature in the reaction vessel is 20–60° C. If the temperature is lower than 20° C., scales are apt to deposit on the wall of the reaction vessel, and if it is higher than 60° C., agglomerates of fine particles are apt to be formed, and in either case, growth at high density becomes difficult. Moreover, at 60° C. or lower, the ratio (B/A) of integrated intensity B of a peak at around $2\theta=18–21°$ to integrated intensity A of a peak at around $2\theta=37–40°$ of X-ray diffraction using CuK$\alpha$ ray can be 1.25 or less, whereby cycle life can be improved. Thus, the temperature in the reaction vessel is suitably 20–60° C.

Embodiment 21 is one in which the aqueous solution of metal salt in the manufacturing method of the present invention is fed so that a feed rate of total metal ions contained in the aqueous solution of metal salt is $2\times10^{-4}$–$2\times10^{-2}$ mol/min. If the feed rate is higher than $2\times10^{-2}$ mol/min, growth at high density is hard to be attained, and if it is lower than $2\times10^{-4}$ mol/min, there are no fine pores on the surface of particles and surface area is considerably reduced. By the feeding at $2\times10^{-4}$ mol/min or higher, a volume of pores having a pore radius of 40 Å or less can be 60% or more of the total pore volume, and charge and discharge efficiency at high rate charge and discharge can be markedly improved. Therefore, it is preferred to feed the aqueous solution of metal salt so that the feed rate of the total metal ions is $2\times10^{-4}$–$2\times10^{-2}$ mol/min.

A sub-combination of the above described features may also be the embodiments of the present invention.

Preferred embodiments will be explained referring to FIG. 1 to FIG. 4.

Preferred Embodiment 1

FIG. 1 illustrates a sealed cylindrical nickel-metal hydride storage battery which uses an active material for positive electrode according to one example of the present invention. In FIG. 1, plate group 10 comprises negative plate 11 and positive plate 12 and separator 13 interposed between the negative plate and the positive plate which are rolled into a spiral. The negative electrode 11 comprises a hydrogen-storing alloy $MmNi_{3.55}Co_{0.75}Mn_{0.4}Al_{0.3}$ as an active material. The positive electrode 12 comprises a nickel oxide as an active material. The electrolyte comprises an aqueous alkaline solution comprising hydroxides of $K^+$, $Na^+$ and $Li^+$ and having a high concentration of 10 mol/l in total. The separator 13 is made of a sulfonated polypropylene and separates the negative plate 11 and the positive plate 12 from each other. The plate group 10 is inserted in a nickel plated steel battery case 14 and holds the electrolyte. The opening of the case 14 is sealed by a gasket 17 and a sealing board 16 fitted with safety valve 18 below cap 19 which also serves as a positive terminal. An insulating sheet 15 is provided between the plate group 10 and the bottom of the case 14. The positive plate 12 is connected to the sealing board 16 through a nickel leading piece 20. In case oxygen gas or hydrogen gas is generated in the battery, the safety valve 18 releases the gas out of the battery to prevent rupture of the battery. The valve working pressure is about 15–20 $kgf/cm^2$. A leading piece for the negative electrode plate which is not shown is connected to the case 14.

In this example, the negative electrode is constructed of an MmNi-based $AB_5$ hydrogen-storing alloy, but the present invention can be similarly practiced in the case of using negative electrodes of other $AB_5$ hydrogen-storing alloys such as LaNi$_5$, AB$_2$ hydrogen-storing alloys such as Zr—Ti—Mn—Ni type, A$_2$B hydrogen-storing alloys such as Mg—Ni type, cadmium negative electrodes, and zinc negative electrodes. Furthermore, a sealed cylindrical battery is employed above, but the present invention can be similarly applied to sealed rectangular batteries, electric vehicle batteries and sealed large-sized stationary batteries.

Figure 2A:
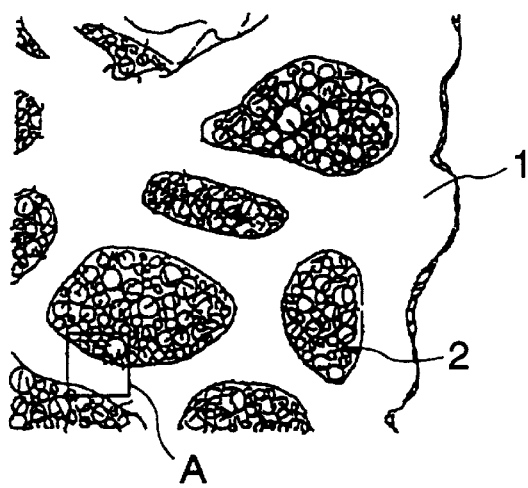
FIG. 2(a) is a schematic view of a nickel positive electrode packed with a metal oxide powder in one example of the present invention.
Figure 2B:
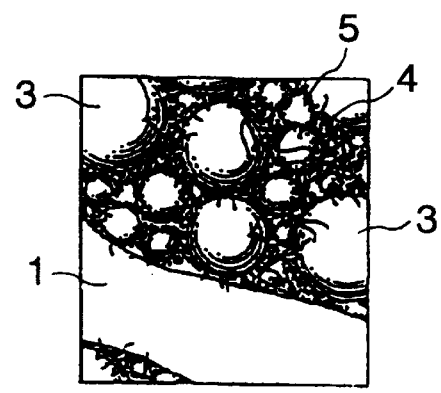
FIG. 2(b) is an enlarged view of portion A in FIG. 2(a).

FIGS. 2(a) and 2(b) schematically show an electrode comprising a foamed nickel substrate and an active material mixture filled in the substrate as an example of the positive electrode according to the present invention. The substrate 1 comprises a foamed nickel. Active material powder 3 is filled in pore portion 2 of the substrate. The active material powder 3 comprises nickel oxide particles in which Mn having an average valence of 3.3 or more is dissolved in the state of solid solution at an atomic ratio of Ni:Mn=9:1. Electrically conductive metal oxide layer 4 comprises a Co oxide having a high conductivity and is present on the surface of active material particles and/or between active material particles or between the active material and the substrate, whereby it has an action to compensate the conductivity between active material particles and between the active material and the substrate. Void portion 5 is present partially between active material particles and between the active material and the substrate.

In the above explanation, the substrate used comprises foamed nickel, but the present invention can be similarly practiced using three-dimensional metallic porous bodies such as nickel felt or planar metallic porous bodies such as punched metal. Moreover, as active material powder, there may also be similarly used oxides of a plurality of metallic elements which comprises Ni as a main metallic element and in which at least one element selected from Al, Ca, Ti, Zn, Sr, Ba, Y, Cd, Co, Cr, rare earth metals and Bi in addition to Ni and Mn are dissolved to form a solid solution.

Figure 3:
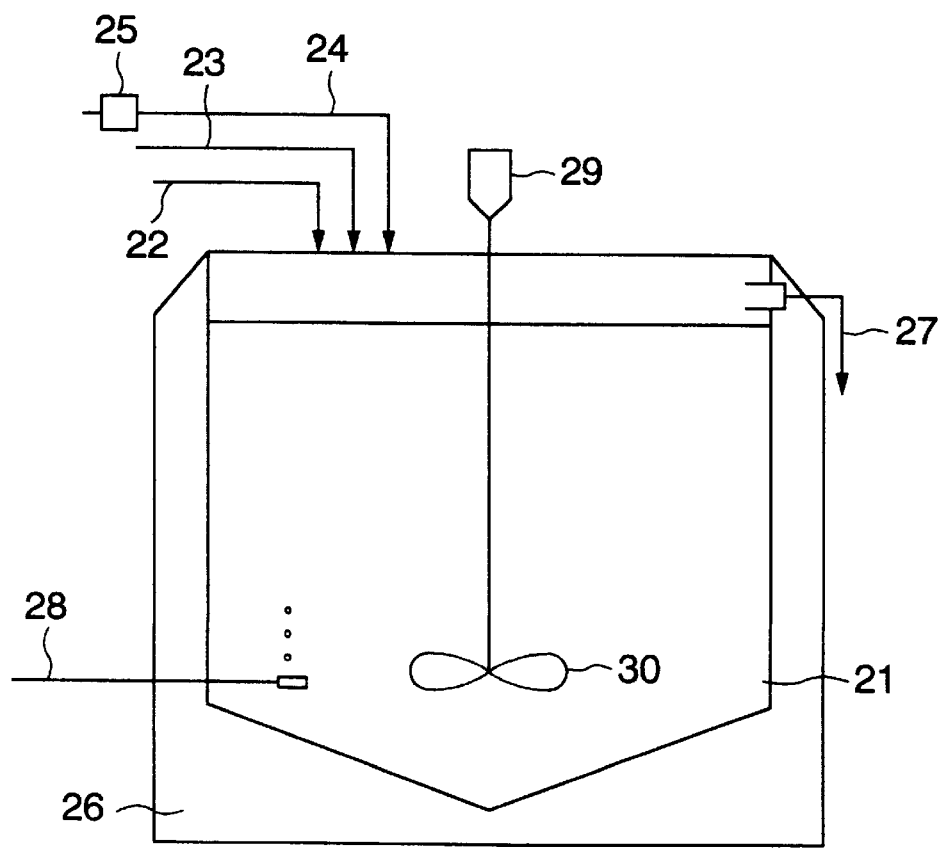
FIG. 3 is a diagram showing an apparatus used for producing metal oxide in one embodiment of the present invention.

FIG. 3 shows one example of the reaction apparatus used for carrying out the manufacturing method of the active material for positive electrode of the present invention. Into reaction vessel 21 are introduced a feed line 22 for aqueous solution of metal salts comprising nickel salt and manganese salt, a feed line 23 for ammonium ion and a feed line 24 for aqueous NaOH solution, and the feed line 24 for aqueous NaOH solution is provided with a pH-stat 25 to adjust feed amount of the aqueous NaOH solution.

The feed line 22 for aqueous solution of metal salt may be a line for feeding an aqueous solution of metal salts of at least one metal selected from Al and/or Ca, Ti, Zn, Sr, Ba, Y, Cd, Co, Cr, rare earth metals and Bi in addition to Ni and Mn.

The reaction vessel 21 is provided with a thermostatic chamber 26, which keeps the temperature in the reaction vessel 21 at constant. Line 27 for taking out a solution containing grown metal oxide particles is provided at the top of the reaction vessel, whereby the solution can be overflowed and continuously taken out.

Feed line 28 for inert gas is introduced from the bottom of the reaction vessel, whereby nitrogen can be continuously fed and the dissolved oxygen can be removed.

Argon gas or helium gas may be continuously fed through the feed line 28 for inert gas. Furthermore, a reducing agent feeding line may be provided in addition to the inert gas feeding line 28 to continuously feed hydrazine and others.

In the reaction vessel 21 is provided an agitating element 30 connected to agitating device 29 to maintain uniformly the various conditions in the reaction vessel 21.

As the reaction apparatus, there may be employed magma type apparatuses having classification function other than the above-mentioned agitation type apparatuses.

The metal oxide powder grown using the above reaction apparatuses and subjected to oxidation treatment is used as the active material for positive electrode in alkaline storage batteries according to the present invention.

Next, examples in which the conditions of the manufacturing method according to the present invention were changed will be explained.

EXAMPLE 1

A mixed aqueous solution containing NiSO$_4$ and MnSO$_4$, an aqueous NaOH solution and an aqueous NH$_3$ solution were prepared, and these solutions were continuously fed at a flow rate of 0.5 ml/min, respectively, to a reaction apparatus of the same construction as shown in FIG. 3 which was kept at 50° C. Simultaneously, Ar gas was continuously fed at a flow rate of 800 ml/min to keep the dissolved oxygen concentration in the apparatus at 0.05 mg/l. Concentrations of the above aqueous solutions were as follows: Concentration of NiSO$_4$ was 2.2 mols/l, that of MnSO$_4$ was 0.2 mol/l, that of NH$_3$ was 5 mols/l, and that of NaOH was varied within the range of 4.2–7 mols/l. The pH value varied in the range of 11–13 depending on variation of concentration of NaOH. Feed rate of Ni and Mn ions in this case was calculated to be $1.2 \times 10^{-3}$ mol/min from the concentrations of the aqueous solution and feeding flow rate of the aqueous solution.

Subsequently, when pH in the reaction apparatus became constant and balance between concentration of metal salts and that of oxide particles became constant to reach steady state, a suspension obtained by overflowing was collected and subjected to decantation to separate the precipitate. This precipitate was washed with water and then the metal oxide powders in the state of being moisturized with water were kept in the air, thereby subjecting the powders to drying and, simultaneously, oxidation treatment. The oxidation condition was to keep the powders at 20–130° C. for 20 minutes to 24 hours in the air. As a result, powders having an average particle size of 10 $\mu$m were obtained.

Figure 4:
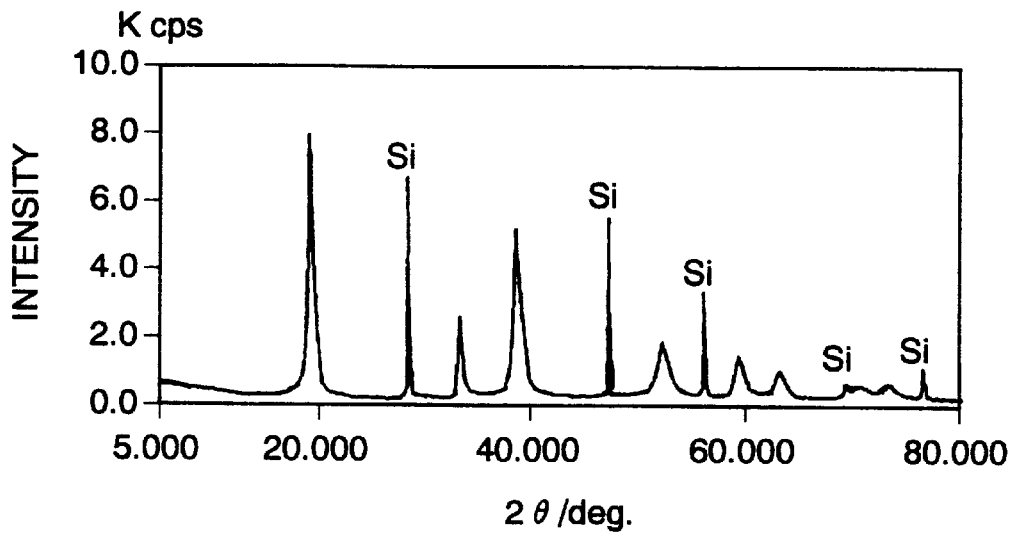
FIG. 4 is an XRD chart of a metal oxide containing Ni as a main element in one example of the present invention.

Compositional analysis of the powders showed that amounts of Mn contained in the resulting metal oxides in the state of solid solution were all about 8 mol %. It was confirmed by XRD pattern of the metal oxides that they were all of β-Ni(OH)$_2$ type single phase. FIG. 4 shows a typical XRD pattern. Furthermore, tap density was measured to obtain 1.7 g/cc or more and it was confirmed that they were materials suitable for attaining high energy density (materials superior in filling properties in electrode substrate).

Furthermore, total valence of all metals was obtained by iodometry and average valence of Mn was calculated from the total valence. The average valence varied in the range of 2.8–3.7 valences depending on oxidation temperature and time. That is, when the oxide was kept at 20° C. for 20 minutes, it was 2.8 valences and when the oxide was kept at 130° C. for 24 hours, it was 3.7 valences. Moreover, since there was recognized a correlation between average valence of Mn or content of Mn and lattice constant (Vegard's rule), it was confirmed that Mn was substituted for a part of Ni to form a solid solution.

X-ray diffraction patterns using CuKα ray showed that the half width of the peak at around 2θ=37–40° differed depending on the difference in pH in the reaction apparatus and was 0.85–1.34 deg. That is, there is the tendency that the half width increases with increase of pH, and when pH was 11, the half width was 0.85 deg and when pH was 13, the half width was 1.34 deg.

To 100 g of the metal oxide powders obtained in this way under various production conditions were added 10 g of $Co(OH)_2$ powders and 40 g of water, followed by kneading them to obtain a paste. This paste was filled in a foamed nickel substrate of 95% in porosity, dried and subjected to pressure molding to obtain a nickel positive plate. The resulting positive plate was cut and an electrode lead was spot welded thereto to obtain a nickel electrode of 1200 mAh in theoretical capacity. The capacity density of the nickel electrode shown here was calculated on the assumption that Ni in the active material undergoes one-electron reaction.

A known negative electrode for alkaline storage batteries was used as the negative electrode. In this example, a negative electrode comprising a hydrogen-storing alloy $MmNi_{3.55}Co_{0.75}Mn_{0.4}Al_{0.3}$ was used. The hydrogen-storing alloy having the desired composition was obtained by melting a mixture of Mm, Ni, Co, Mn and Al at a desired ratio in an arc smelting furnace. This alloy ingot was mechanically ground in an inert atmosphere to make powders of 30 $\mu m$ in particle size. Water and carboxymethyl-cellulose as a binder were added to the powders, followed by kneading them to prepare a paste. This paste was filled in electrode substrate under pressure to obtain a hydrogen-storing alloy negative electrode plate. This negative electrode plate was cut to make a negative electrode of 1920 mAh in capacity.

A spiral electrode group was made of the above positive electrode and negative electrode and a separator comprising a sulfonated polypropylene nonwoven fabric of 0.15 mm thick interposed between the negative and positive electrodes. This electrode group was put in a battery case and 2.2 ml of an aqueous KOH solution of 10 mol/l in concentration was poured into the case. Then, the opening of the case was sealed by a sealing board having a safety valve of about 20 $kgf/cm^2$ in working pressure to make a sealed cylindrical nickel-hydrogen storage battery of AA size.

First, the sealed cylindrical batteries were made using the above-mentioned samples differing in average valence of Mn as active materials, and battery characteristics were evaluated. The batteries were repeatedly subjected to a charge and discharge cycle which comprised charging at a current of 120 mA at 20° C. for 18 hours and discharging at a current of 240 mA until the battery voltage reached 1.0 V. When discharge capacity was stabilized, a utilization factor of the active materials was obtained from the measured discharge capacity. The utilization factor was calculated from the ratio of the measured discharge capacity to the theoretical capacity when Ni in the active materials underwent one-electron reaction.

Figure 5:
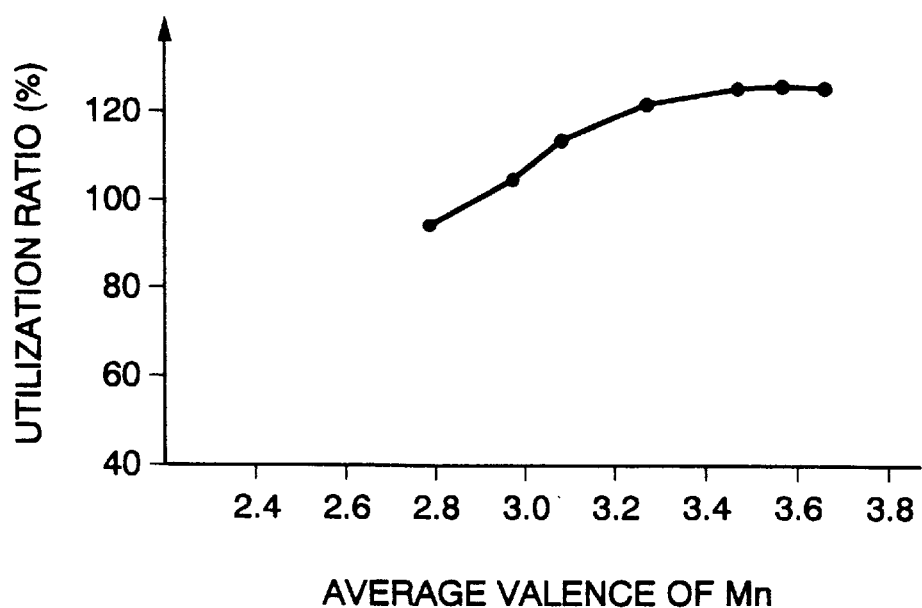
FIG. 5 is a graph which shows change of utilization factor in respect to average valence of Mn of metal oxide in one example of the present invention.

FIG. 5 shows the results of these experiments and is a characteristic curve showing the relation between the average valence of Mn and the utilization factor. It can be seen from this curve that when the average valence of Mn is lower than 3.3 valences, the utilization factor tends to increase with increase of the valence of Mn, and nearly no increase of the utilization factor is seen when the valence of Mn exceeds 3.3. Therefore, the average valence of Mn is suitably 3.3 or more.

Next, the sealed cylindrical batteries were made using the samples differing in the half width of the peak at around $2\theta=38.5°$ of the X-ray diffraction pattern using CuK$\alpha$ ray as active materials. Battery characteristics of these batteries were evaluated. The utilization factor was obtained in the same manner as above.

Figure 6:
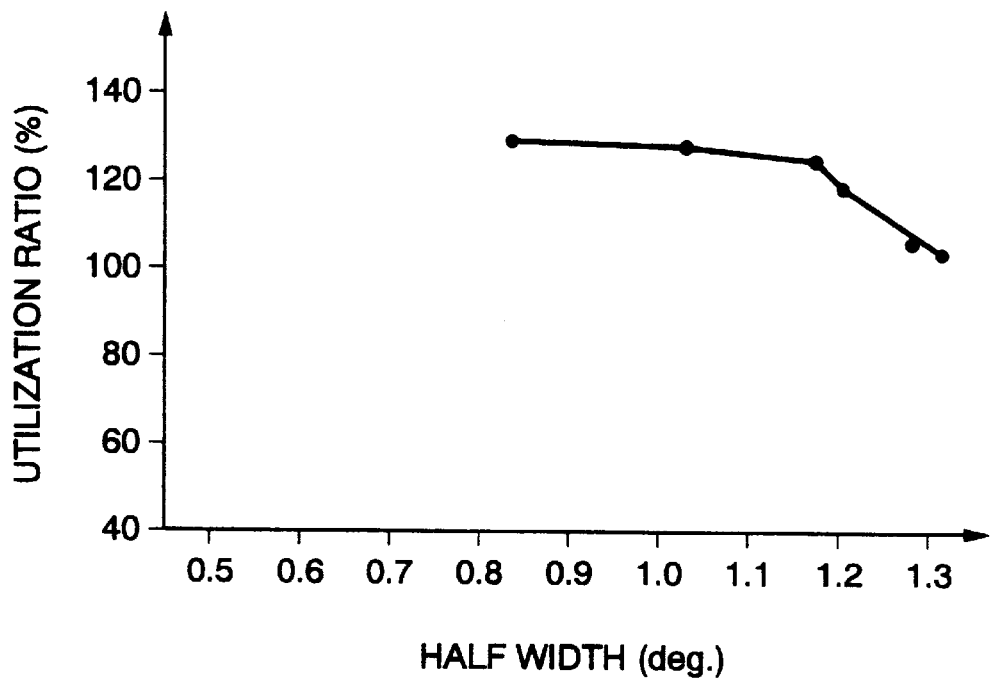
FIG. 6 is a graph which shows change of utilization factor in respect to half width of a peak at around $2\theta=37-40°$ of X-ray diffraction using CuKα ray of a metal oxide in one example of the present invention.

FIG. 6 shows the results of these experiments and is a characteristic curve showing the relation between the half width and the utilization factor. It can be seen from the graph that when the half width is greater than 1.2, the utilization factor tends to decrease with increase of the half width and a high utilization factor is shown when the half width is 1.2 or less. Therefore, the half width of the peak at around $2\theta=38.5°$ of the X-ray diffraction pattern using CuK$\alpha$ ray is preferably 1.2 or less.

EXAMPLE 2

Nickel oxide was prepared in the same manner as in Example 1, except that concentration of the aqueous NaOH solution was changed to 5.5 mol/l, pH was controlled to be constant at about 12.0, and temperature in the reaction apparatus was changed within the range of 20–80° C. Furthermore, the oxidation condition was to keep at 80° C. for 24 hours in the air. Metal oxide powders were obtained in the same manner as in Example 1 except for the above changes in conditions.

The resulting metal oxide powders were all spherical powders of 10 $\mu m$ in average particle size and had a tap density of 1.7 g/cc or more. Furthermore, the metal oxides all comprised $\beta$-$Ni(OH)_2$ type single phase, and amount of Mn dissolved in the form of solid solution was about 8 mol %. Moreover, average valence of Mn was calculated in the same manner as in Example 1 to obtain 3.6 valences for all of the oxides. X-ray diffraction pattern using CuK$\alpha$ ray showed that the ratio B/A of integrated intensity B of a peak at around $2\theta=18-21°$ to integrated intensity A of a peak at around $2\theta=37-40°$ differed depending on the difference of the temperature in the reaction apparatus and varied in the range of B/A=1.1–1.3. That is, B/A tends to increase with increase of the temperature in the reaction vessel, and was 1.1 at 20° C. and 1.3 at 80° C.

The sealed cylindrical batteries were made in the same manner as in Example 1 except for using as an active material the above-mentioned samples differing in the ratio B/A of integrated intensity of peaks in the X-ray diffraction pattern using CuK$\alpha$ ray, and the battery characteristics were evaluated. The evaluation was conducted first by subjecting the batteries to 10 charge and discharge cycles, one cycle of which comprised charging at a current of 120 mA for 18 hours and discharging at a current of 240 mA to a battery voltage of 1.0 V at 20° C. and, then, after discharge capacity was stabilized, subjecting the batteries to repeated charge and discharge cycles, one cycle of which comprised charging at a current of 0.6 A for 3 hours and discharging at a current of 0.6 A to a battery voltage of 0.8 V at 45° C. Ratio of U(300th)/U(1st) of the utilization factor at the first cycle U (1st) and that at 300th cycle U (300th) in the above charge and discharge cycle at 450° C. (hereinafter referred to as "capacity retention rate") was obtained, whereby cycle stability (life characteristics) was evaluated.

Figure 7:
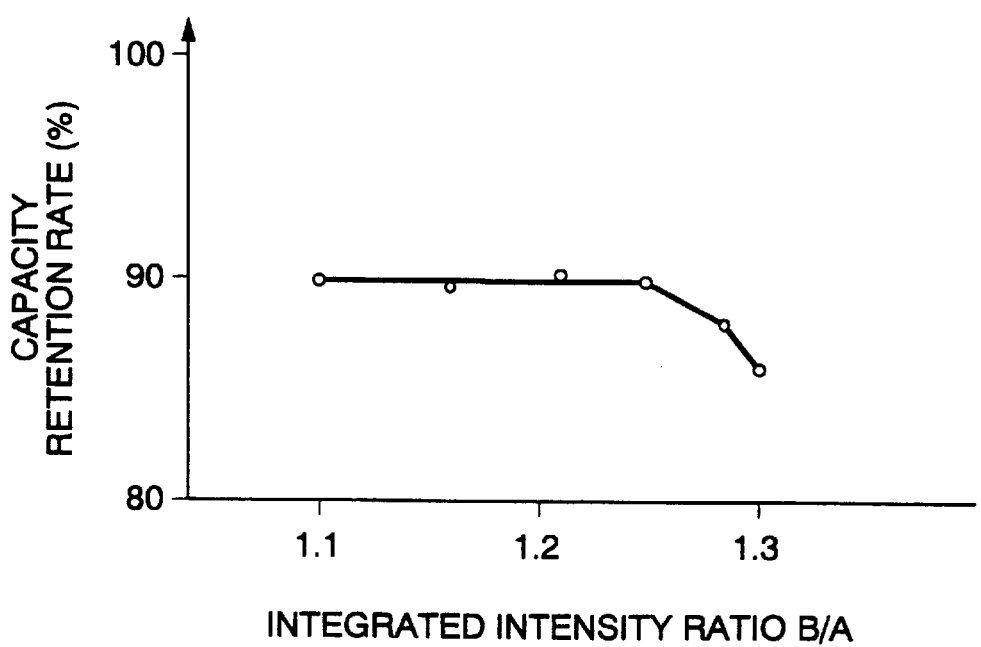
FIG. 7 is a graph which shows change of capacity retention rate with change of ratio (B/A) of integrated intensity B of the peak positioned at around $2\theta=18-21°$ to integrated intensity A of the peak positioned at around $2\theta=37-40°$ of X-ray diffraction using CuKα ray of a metal oxide in one example of the present invention.

FIG. 7 is a graph showing the results of the experiments and is a characteristic curve showing the relation between the integrated intensity ratio B/A and the capacity retention rate U(300th)/U(1st). It can be seen from this graph that a high capacity retention rate is obtained at an integrated intensity ratio B/A of 1.25 or less. Therefore, in order to enhance the cycle stability, the ratio B/A of integrated intensity B of a peak at around $2\theta=18-21°$ to integrated intensity A of a peak at around $2\theta=37-40°$ in X-ray diffraction pattern using CuK$\alpha$ ray is preferably 1.25 or less.

EXAMPLE 3

In the conditions for the production of metal oxides in Example 1, concentration of the aqueous NaOH solution was changed to 5.5 mol/l, pH was controlled to be constant at about 12.0, and the feed rate of Ni ion and Mn ion was changed in the range of $5\times10^{-5}$–$2\times10^{-2}$ mol/min. The oxidation condition was to keep at 80° C. for 24 hours in the air. Metal oxide powders were obtained in the same manner as in Example 1 except for the above changes in the conditions.

The resulting metal oxide powders were all spherical powders of 10 μm in average particle size and had a tap density of 1.7 g/cc or more. Furthermore, the metal oxides all comprised β-Ni(OH)$_2$ type single phase, and amount of Mn dissolved in the form of solid solution was about 8 mol %. Moreover, average valence of Mn was calculated in the same manner as in Example 1 to obtain 3.6 valences for all the oxides. Furthermore, pore distribution was measured by nitrogen gas adsorption method to find that the proportion of the volume of pores having a pore radius of 40 Å or less to the total pore volume (hereinafter referred to as "proportion of pore volume having 40 Å or less") varied within the range of 40–80% depending on the difference in the feed rate of Ni and Mn ions.

That is, the proportion of pore volume having 40 Å or less tends to increase with increase in the feed rate, and was 40% at $5\times10^{-5}$ mol/min and 80% at $2\times10^{-2}$ mol/min.

The sealed cylindrical batteries were made in the same manner as in Example 1 except for using the above-mentioned samples differing in the proportion of pore volume having 40 Å or less as active materials, and battery characteristics were evaluated. The evaluation was conducted first by subjecting the batteries to 10 charge and discharge cycles, one cycle of which comprised charging at a current of 120 mA for 18 hours and discharging at a current of 240 mA to a battery voltage of 1.0 V at 20° C. and, then, after discharge capacity was stabilized, subjecting the batteries to charging at a current of 120 mA for 18 hours and discharging at a current value of 240 mA and 1.2 A to a battery voltage of 0.8 V at 20° C. Ratio of U(1.2A)/U(240 mAh) of the utilization factor U (1.2 A) when discharged at 1.2 mA to the utilization factor (240 mA) when discharged at 240 mA (hereinafter referred to as "discharge capacity ratio") was obtained, whereby high rate discharge characteristics were evaluated.

Figure 8:
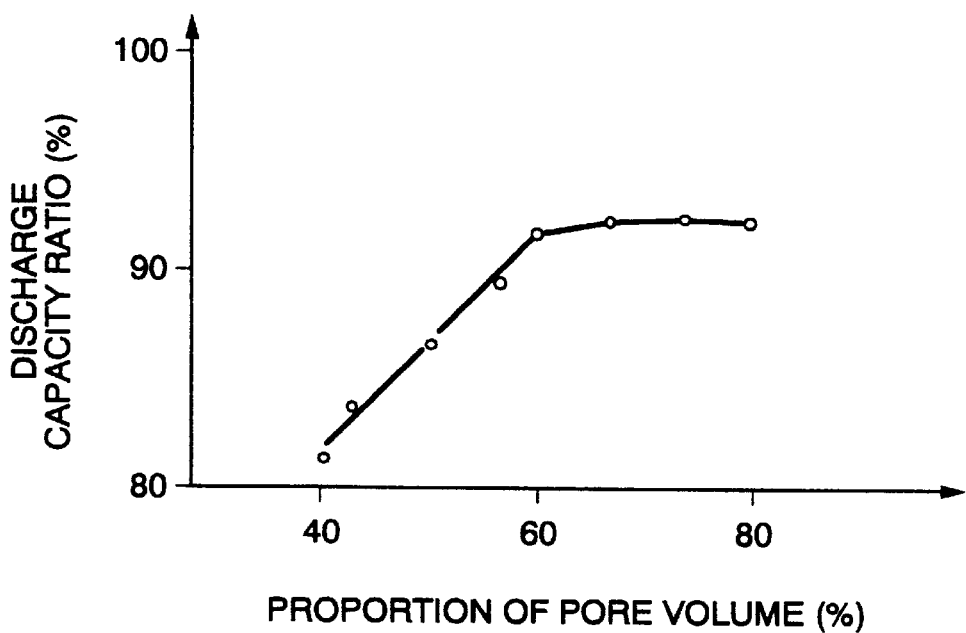
FIG. 8 is a graph which shows change of discharge capacity rate in respect to the ratio of volume of pores having a pore radius of 40 Å or less to total pore volume of a metal oxide in one example of the present invention.

FIG. 8 is a graph showing the results of the experiments and is a characteristic curve showing the elation between the proportion of pore volume having 40 Å or less and the discharge capacity ratio (U(1.2 A)/U(240 mA)). It can be seen from this graph that a high discharge capacity ratio is obtained at a proportion of pore volume of 60% or higher. Therefore, in order to improve the high rate discharge characteristics, the proportion of pore volume having a pore radius of 40 Å or less to the total pore volume is preferably 60% or higher.

EXAMPLE 4

In the conditions for the preparation of metal oxides in Example 1, concentration of the aqueous NaOH solution was changed to 5.5 mol/l, pH was controlled to be constant at about 12.0, and the oxidation condition was to keep al 80° C. for 24 hours in the air. Metal oxide powders were obtained in the same manner as in Example 1 except for the above changes in the conditions.

The resulting metal oxide powders were all spherical powders of 10 μm in average particle size and had a tap density of 1.7 g/cc or more. Furthermore, the metal oxides all comprised β-Ni(OH)$_2$ type single phase, and amount of Mn dissolved in the state of solid solution was about 8 mol %. Average valence of Mn in the metal oxides was measured in the same manner as in Example 1 to obtain 3.6 valences.

The half width of the peak at around $2\theta=37$–$40°$ of the X-ray diffraction pattern using CuKα ray was 0.75 deg, and the ratio B/A of integrated intensity B of a peak at around $2\theta=18$–$21°$ to integrated intensity A of a peak at around $2\theta=37$–$40°$ in X-ray diffraction pattern using CuKα ray was 1.15. Furthermore, pore distribution was measured by nitrogen gas adsorption method to find that the proportion of the volume of pores having a pore radius of 40 Å or less to the total pore volume was 68%.

Sealed cylindrical nickel-hydrogen storage batteries were made in the same manner as in Example 1 using the above samples, and battery characteristics were evaluated. The evaluation was conducted by measuring the utilization factor, the discharge capacity ratio (U(1.2 A)/U(240 mA)) and the capacity retention rate (U(300th)/U(1st)) in the same manners as in Examples 1, 2 and 3. For comparison, a sealed cylindrical nickel-hydrogen storage battery was made in the same manner as above, except for using conventional nickel oxide powders containing 1% by weight of Co and 4% by weight of Zn in the state of solid solution as an active material, and battery characteristics were evaluated as Comparative Example 1.

Results of the experiments are shown in Table 1. It can be seen from Table 1 that the metal oxides of the present invention showed higher utilization factor than the conventional Ni(OH)$_2$, and were nearly the same as the conventional Ni(OH)$_2$ in the high rate discharge characteristics and the life characteristics.

TABLE 1

| | Active material for positive electrode | |
|---|---|---|
| Items of evaluation | The present invention (Example 1) | Conventional active material (Comparative Example 1) |
| Utilization factor (U(240 mA)) | 130% | 100% |
| Discharge capacity ratio (U(1.2 A)/U(240 mA)) | 93% | 94% |
| Capacity retention rate (U(300 th)/U(1 st)) | 90% | 92% |

EXAMPLE 5

Metal oxides were prepared in the same manner as in Example 4, except that a mixed solution changed in concentration ratio of NiSO$_4$ and MnSO$_4$ was used so that amount of Mn dissolved in the state of solid solution was 0–16 mol %.

The resulting metal oxide powders in which Mn was dissolved in the state of solid solution were all spherical powders of 10 μm in average particle size and had a tap density of 1.7 g/cc or more. Furthermore, they all comprised β-Ni(OH)$_2$ type single phase, and the average valence of Mn was in the range of 3.5–3.6 valences. The half width of the peak at around $2\theta=37$–$40°$ of the X-ray diffraction pattern using CuKα ray was 0.6–0.9 deg, and the ratio B/A of integrated intensity B of a peak at around $2\theta=18$–$21°$ to integrated intensity A of a peak at around $2\theta=37$–$40°$ in X-ray diffraction pattern using CuKα ray was in the range of 1.0–1.2. Furthermore, pore distribution was measured by nitrogen gas adsorption method to find that the proportion of the volume of pores having a pore radius of 40 Å or less to the total pore volume was in the range of 65–73%.

Sealed cylindrical batteries were made in the same manner as in Example 4 using these metal oxides as active materials, and utilization factor was obtained from discharged ampere-hour at 240 mA at 20° C. Furthermore, volume energy density (actual capacity density) of electrode was obtained from the electrode filling density and the utilization factor. With regard to the electrode filling density, rolling ratio at the time of making the electrode was adjusted so that pore volume ratio (porosity) calculated from volume of the electrode and true specific gravity of the packed active material and additives was 25%.

Figure 9:
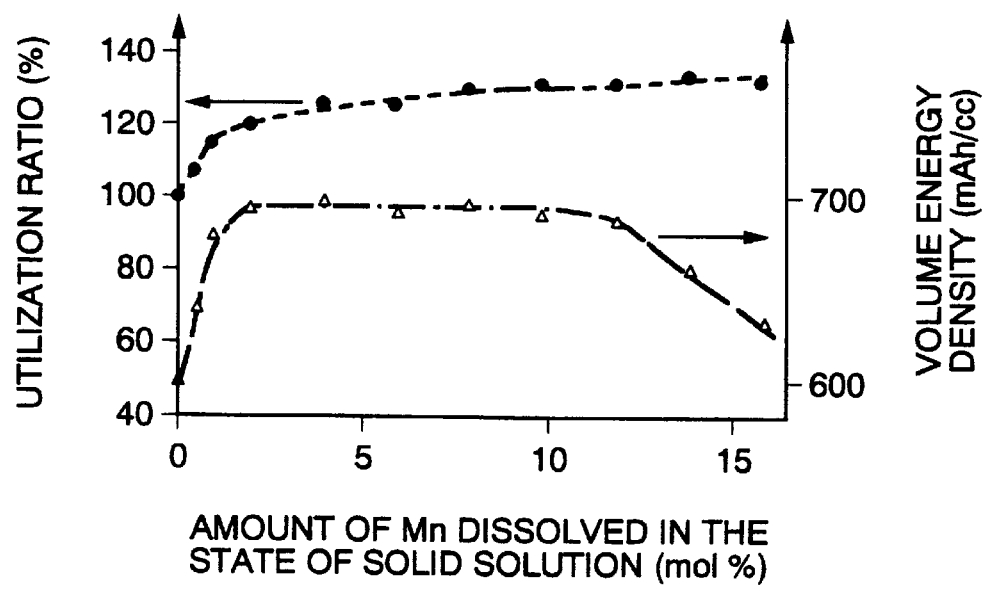
FIG. 9 is a graph which shows change of utilization factor and volume energy density in respect to amount of Mn contained in the state of solid solution in a metal oxide in one example of the present invention.

FIG. 9 shows the results of these experiments and is a characteristic curve showing the relation between the amount of Mn dissolved in the state of solid solution and the utilization factor and the volume energy density of electrode. It can be seen from FIG. 9 that when the amount of Mn dissolved in the state of solid solution is 1.0 mol % or more, the utilization factor is considerably high. It can also be seen that when the amount of Mn dissolved in the state of solid solution is 1.0 mol % or more, the volume energy density is high and when it is more than 12.0 mol %, the volume energy density rather decreases. The volume energy density has also a deep relation with electrode filling density in addition to the utilization factor, and, furthermore, the filling density greatly affects the tap density of active material. Therefore, when the amount of Mn dissolved in the state of solid solution is large, distortion is apt to occur in the crystal due to difference in ion radius of Ni and Mn to result in decrease of tap density and electrode packing density. It is considered that this causes decrease of the volume energy density. Thus, amount of Mn dissolved in the state of solid solution is suitably 1.0–12.0 mol %.

EXAMPLE 6

A metal oxide mainly composed of Ni and containing Mn and Al was prepared in the same manner as in Example 4, except that a mixed solution containing 2.1 mol/l of $NiSO_4$, 0.2 mol/l of $MnSO_4$ and 0.1 mol/l of $Al_2(SO_4)_3$ was used as a starting material.

The resulting metal oxide was spherical powder of 10 $\mu$m in average particle size. As a result of compositional analysis, amounts of Mn and Al dissolved in the state of solid solution were 8 mol % and 4 mol %, respectively, and it comprised $\beta$-$Ni(OH)_2$ type single phase. Total valence of all metals was obtained by iodometry, and the average valence of Mn was calculated therefrom to obtain 3.6 valences. The half width of the peak at around 2θ=37–40° of the powder X-ray diffraction pattern using CuKα ray was 0.81 deg, and the ratio B/A of integrated intensity B of the peak at around 2θ=18–21° to integrated intensity A of the peak at around 2θ=37–40° in X-ray diffraction pattern using CuKα ray was 1.22. Furthermore, pore distribution was measured by nitrogen gas adsorption method to find that the proportion of the volume of pores having a pore radius of 40 Å or less to the total pore volume was 65%.

In the same manner as in Example 4, a sealed cylindrical battery was made using the resulting metal oxide as an active material, and characteristics of the battery were evaluated. The results are shown together with the results of the following Example 7.

EXAMPLE 7

A metal oxide mainly composed of Ni and containing Mn and Ca was prepared in the same manner as in Example 4, except that a mixed solution containing 2.1 mol/l of $Ni(NO_3)_2$, 0.2 mol/l of $Mn(No_3)_2$ and 0.1 mol/l of $Ca(NO_3)_2$ was used as a starting material.

The resulting metal oxide was spherical powder of 10 $\mu$m in average particle size. As a result of compositional analysis, amounts of Mn and Ca dissolved in the state of solid solution were 8 mol % and 4 mol %, respectively, and it comprised $\beta$-$Ni(OH)_2$ type single phase. Total valence of all metals was obtained by iodometry, and the average valence of Mn was calculated therefrom to obtain 3.6 valences. The half width of the peak at around 2θ=37–40° of the powder X-ray diffraction pattern using CuKα ray was 0.73 deg, and the ratio B/A of integrated intensity B of the peak at around 2θ=18–21° to integrated intensity A of the peak at around 2θ=37–40° in the powder X-ray diffraction pattern using CuKα ray was 1.17. Furthermore, pore distribution was measured by nitrogen gas adsorption method to find that the proportion of the volume of pores having a pore radius of 40 Å or less to the total pore volume was 71%.

In the same manner as in Example 4, a sealed cylindrical battery was made using the resulting metal oxide as an active material, and characteristics of the battery were evaluated.

Furthermore, for comparison, a nickel oxide was prepared in the same manner as in Example 4, except that 2.4 mol/l of $NiSO_4$ was used as a starting material. The resulting nickel oxide was spherical powder of 10 $\mu$m in average particle size.

In the same manner as in Example 4, a sealed cylindrical battery of Comparative Example 2 was made using the resulting nickel oxide powder as an active material.

In the same manner as in Example 1, utilization factor of the active materials was obtained using the sealed cylindrical batteries of Examples 4, 6 and 7 and Comparative Example 2. Furthermore, in discharging of this experiment, voltage was measured at a depth of discharge corresponding to quantity of electricity which was ½ of actual discharge capacity (DOD=50%). Moreover, in charging of the experiment, the utilization factor of the active material was measured in the same manner as above, except that the test temperature was set at 45° C. The results are shown in Table 2.

TABLE 2

| Active material | Utilization factor of active material (%) | | Discharge voltage |
| | Charging at 20° C. | Charging at 45° C. | (V) Discharging at 20° C. |
| --- | --- | --- | --- |
| Example 4 | 130 | 98 | 1.18 |
| Example 6 | 126 | 87 | 1.24 |
| Example 7 | 120 | 100 | 1.18 |
| Comparative Example 2 | 100 | 86 | 1.23 |

As can be seen from Table 2, discharge voltage can be improved by dissolving Al in the state of solid solution, and charging efficiency at high temperatures can be improved by dissolving Ca in the state of solid solution.

Examples of oxides containing Ca in addition to Ni and Mn are shown hereinabove, but the charge efficiency at high temperatures could also be improved using Mg, Ti, Zn, Sr, Ba, Y, Cd, Co, Cr, rare earth metals or Bi other than Ca. Furthermore, in the oxides containing Al in combination with the elements dissolved in the state of solid solution, a synergistic effect of improvement of discharge voltage and that of charge efficiency was recognized.

EXAMPLE 8

In accordance with the process of preparation of metal oxide in Example 4, metal oxide powders covered with a surface layer of a Co oxide were prepared by introducing in water the metal oxide powders after subjected to oxidation and adding thereto dropwise 20% by weight of aqueous cobalt sulfate solution and 25% by weight of aqueous sodium hydroxide solution under stirring.

The resulting metal oxide was spherical powder of 10 μm in average particle size. As a result of compositional analysis, the ratio of the metal oxide in the inner layer of the powder and the Co oxide of the surface layer of the powder was 10:1 in % by weight.

A sealed cylindrical battery was made using the resulting metal oxide powder in the same manner as in Example 4.

In the same manner as in Example 4, utilization factor of the active material was measured using the sealed cylindrical batteries made in Examples 4 and 8. Furthermore, utilization factor when the current in discharging in this experiment was 1200 mA was measured. The results are shown in Table 3.

TABLE 3

|  | Utilization factor of active material (%) | |
| --- | --- | --- |
| Active material | Charging at 240 mA | Discharging at 1200 mA |
| Example 4 | 140 | 120 |
| Example 8 | 131 | 124 |

As is clear from Table 3, it was confirmed that in the case of using metal oxides covered with a surface layer of Co oxide, a high utilization factor was also obtained, and there is the effect to improve the utilization factor especially at high rate discharging.

The same effect was also obtained in the case of using metal oxides covered with a surface layer of a conductive metal oxide or metal other than Co oxide.

EXAMPLE 9

Metal oxide powders were obtained in the same manner as in Example 4, except that the flow rate of Ar gas was 0–1200 ml/min and the dissolved oxygen concentration was changed to 0.03–9.00 mg/l.

Figure 10:
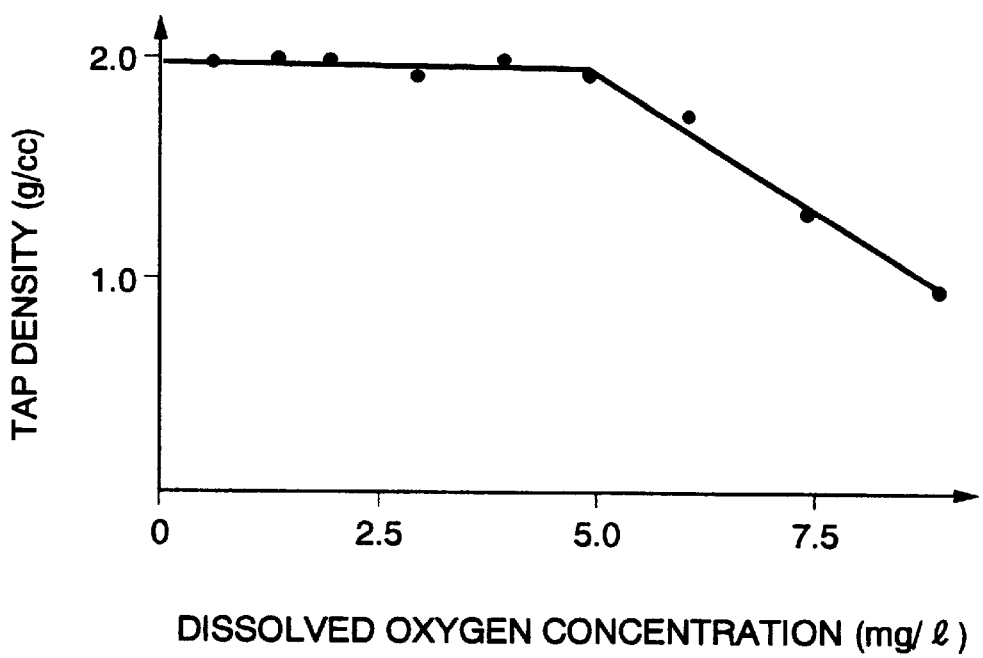
FIG. 10 is a graph which shows change of tap density of metal oxide in respect to concentration of dissolved oxygen in a reaction vessel in the process of production of the metal oxide.

FIG. 10 shows the relation between the dissolved oxygen concentration and the tap density of the resulting metal oxide. As can be seen from FIG. 10, the metal oxide has a high tap density at a dissolved oxygen concentration of 5 mg/l or less. Therefore, it is considered that the dissolved oxygen concentration is preferably 5 mg/l or less.

In the above example, Ar gas was used, but the dissolved oxygen concentration could similarly be kept at 5 mg/l or less when other inert gases such as nitrogen and helium were used, and metal oxides having the similar characteristics could be obtained. Furthermore, even in the case of using them in combination, or using a reducing agent such as hydrazine, the similar results were obtained.

For comparison, metal oxide powders were obtained in accordance with the process of Example 9, except that the oxidation was inhibited by drying in vacuum after the metal oxide was washed with water.

Average valence of Mn in the resulting metal powders was measured to obtain 2.4 valences. The utilization factor of the active material was very low, namely, 92%. Therefore, oxidation treatment is necessary to increase the Mn valence.

EXAMPLE 10

Metal oxide powders were obtained in the same manner as in Example 4, except that the oxidation of metal oxide powders was carried out by keeping them at 0–130° C. for 20 minutes to 24 hours in the air.

Figure 11:
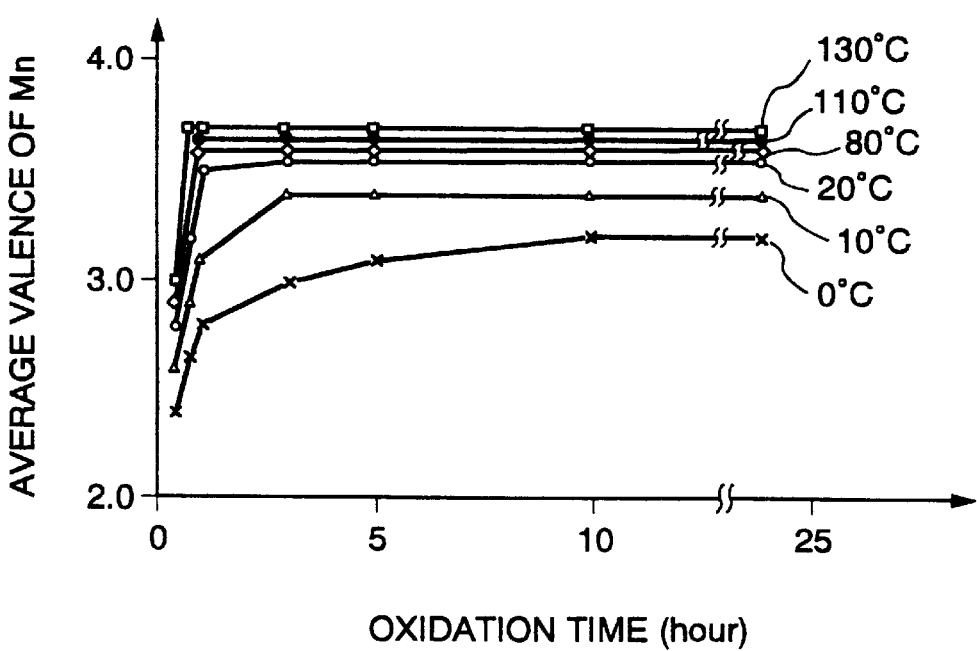
FIG. 11 is a graph which shows change of average valence of Mn in respect to retention time (oxidation time) at each temperature (oxidation temperature) in the atmosphere in the process of production according to the present invention.

FIG. 11 shows the relation between the oxidation time at each oxidation temperature and the average valence of Mn of the metal oxide. It is considered from FIG. 11 that it is suitable to keep the metal oxide at 20° C. or higher for at least 1 hour for obtaining metal oxides of 3.3 valences or more in average valence of Mn.

However, when the oxidation is carried out at higher than 110° C., the utilization factor tends to decrease. It is considered that this is because decomposition reaction of the metal oxide proceeded owing to the oxidation treatment. Therefore, it is considered that the oxidation temperature is suitably 20–110° C.

The oxidation was carried out here by keeping the metal oxide in the air, but the average valence of Mn could be similarly made to 3.3 valences or more with using oxygen or oxidizing agents such as hydrogen peroxide, sodium perchlorate, potassium perchlorate and the like.

EXAMPLE 11

Metal oxide powders were obtained in the same manner as in Example 4, except that the pH value in the reaction vessel was changed within the range of 10–13.

When the metal oxides were subjected to X-ray diffraction using CuKα ray, it was necessary that the pH value was 12.5 or lower in order that the half width of the peak at around $2\theta=37-40°$ was 1.2 deg or less. Furthermore, when the pH value was lower than 11, it was difficult to grow the metal oxides at high density, and, besides, the tap density was lower than 1.7 g/cc.

EXAMPLE 12

Metal oxide powders were obtained in the same manner as in Example 4, except that the temperature in the reaction vessel was changed within the range of 10–80° C.

When these metal oxides were subjected to X-ray diffraction using CuKα ray, it was necessary to keep the temperature at 60° C. or lower in order that the ratio B/A of integrated intensity B of the peak at around $2\theta=18-21°$ to integrated intensity A of the peak at around $2\theta=37-40°$ was 12.5 or less. When the temperature was lower than 20° C., not only the control of temperature became difficult, but also considerable scales were produced. Therefore, growth at high density was difficult and the tap density was lower than 1.7 g/cc.

EXAMPLE 13

Metal oxide powders were obtained in the same manner as in Example 4, except that the feed rate of the total metal ions contained in the aqueous solution of metal salts was changed within the range of $5\times10^{-5}-5\times10^{-2}$ mol/min.

When the pore distribution was measured by nitrogen gas adsorption method on these metal oxides, it was necessary that the feed rate of the total metal ions was $2\times10^{-4}$ mol/min or higher in order that the proportion of the volume of pores having a pore radius of 40 Å or less to the total pore volume was 60% or higher. Furthermore, when the feed rate was higher than $2\times10^{-2}$ mol/min, growth at high density was difficult due to conspicuous reduction of residence time, and the tap density decreased to lower than 1.7 g/cc.

As explained above, according to the present invention, the utilization factor of active materials for positive electrode can be enhanced and the energy density can be greatly improved. Furthermore, life characteristics and high rate discharge characteristics can be improved.

Thus, alkaline storage batteries excellent in energy density are provided.

What is claimed is:

1. An active material for positive electrodes in alkaline storage batteries, said active material consisting essentially of a nickel oxide of β phase-Ni(OH)$_2$ containing at least Mn in the state of solid solution or eutectic mixture, characterized in that the average valence of Mn is 3.3 valences or more, the tap density is 1.7 g/cc or more and the half width of a peak at around 2θ=37–40° of X-ray diffraction using CuKα ray is 1.2 deg or less.

2. An active material according to claim 1, wherein the content of Mn contained in the state of solid solution or eutectic mixture in the nickel oxide is 1–12 mol % based on the total metallic elements.

3. An active material according to claim 1, wherein the nickel oxide comprises powders having a spherical or similar shape.

4. An active material according to claim 1, wherein the nickel oxide contains at least Al in addition to Ni and Mn.

5. An active material according to claim 1, wherein the nickel oxide contains, in addition to Ni and Mn, at least one element selected from the group consisting of Ca, Mg, Ti, Zn, Sr, Ba, Y, Cd, Co, Cr, rare earth metals and Bi.

6. An active material according to claim 1, wherein a powder particle of said nickel oxide is covered with a surface layer of an electrically conductive metal oxide or metal.

7. An alkaline storage battery which comprises a nickel positive electrode, a negative electrode, an alkaline electrolyte and a separator, wherein an active material of the nickel positive electrode is a material as defined in claim 1.

8. An active material for positive electrodes in alkaline storage batteries, said active material consisting essentially of a nickel oxide of β phase-Ni(OH)$_2$ containing at least Mn in the state of solid solution or eutectic mixture, characterized in that the average valence of Mn is 3.3 valences or more, the tap density is 1.7 g/cc or more and the ratio of B/A of integrated intensity B of a peak at around 2θ=18–21° to integrated intensity A of a peak at around 2θ=37–40° of X-ray diffraction using CuKα ray is 1.25 or less.

9. An active material according to claim 8, wherein the content of Mn contained in the state of solid solution or eutectic mixture in the nickel oxide is 1–12 mol % based on the total metallic elements.

10. An active material according to claim 8, wherein the nickel oxide comprises powders having a spherical or similar shape.

11. An active material according to claim 8, wherein the nickel oxide contains at least Al in addition to Ni and Mn.

12. An active material according to claim 8, wherein the nickel oxide contains, in addition to Ni and Mn, at least one element selected from the group consisting of Ca, Mg, Ti, Zn, Sr, Ba, Y, Cd, Co, Cr, rare earth metals and Bi.

13. An active material according to claim 8, wherein the nickel oxide powders are covered with a surface layer of an electrically conductive mgtal oxide or metal.

14. An active material for positive electrodes in alkaline storage batteries, said active material consisting essentially of a nickel oxide of β phase-Ni(OH)$_2$ containing at least Mn in the state of solid solution or eutectic mixture, characterized in that the average valence of Mn is 3.3 valences or more, the tap density is 1.7 g/cc or more, and the volume of pores having a pore radius of 40 Å or less is 60% or more of the total pore volume.

15. An active material according to claim 14, wherein the content of Mn contained in the state of solid solution or eutectic mixture in the nickel oxide is 1–12 mol % based on the total metallic elements.

16. An active material according to claim 14, wherein the nickel oxide comprises powders having a spherical or similar shape.

17. An active material according to claim 14, wherein the nickel oxide contains at least Al in addition to Ni and Mn.

18. An active material according to claim 14, wherein the nickel oxide contains, in addition to Ni and Mn, at least one element selected from the group consisting of Ca, Mg, Ti, Zn, Sr, Ba, Y, Cd, Co, Cr, rare earth metals and Bi.

19. An active material according to claim 14, wherein the nickel oxide powders are covered with a surface layer of an electrically conductive metal oxide or metal.

20. An active material for positive electrodes in alkaline storage batteries, said active material consisting essentially of a nickel oxide of β phase-Ni(OH)$_2$ containing at least Mn in the state of solid solution or eutectic mixture, characterized in that the average valence of Mn is 3.3 valences or more, the tap density is 1.7 g/cc or more, the halfwidth of a peak at around 2θ=37–40° of X-ray diffraction using CuKα ray is 1.2 deg or less, the ratio B/A of integrated intensity B of a peak at around 2θ=18–21° to integrated intensity A of a peak at around 2θ=37–40° of X-ray diffraction using CuKα ray is 1.25 or less, and the volume of pores having a pore radius of 40 Å or less is 60% or more of the total pore volume.

21. An active material according to claim 20, wherein the content of Mn contained in the state of solid solution or eutectic mixture in the nickel oxide is 1–12 mol % based on the total metallic elements.

22. An active material according to claim 20, wherein the nickel oxide comprises powders having a spherical or similar shape.

23. An active material according to claim 20, wherein the nickel oxide contains at least Al in addition to Ni and Mn.

24. An active material according to claim 20, wherein the nickel oxide contains, in addition to Ni and Mn, at least one element selected from the group consisting of Ca, Mg, Ti, Zn, Sr, Ba, Y, Cd, Co, Cr, rare earth metals and Bi.

25. An active material according to claim 20, wherein the nickel oxide powders are covered with a surface layer of an electrically conductive metal oxide or metal.

26. A method for manufacturing an active material for positive electrodes in alkaline storage batteries, said active material consisting essentially of a nickel oxide of β phase-Ni(OH)$_2$ containing at least Mn in the state of solid solution or eutectic mixture, with an average valence of Mn of 3.3 valences or more and a tap density of 1.7 g/cc or more, characterized by continuously reacting an aqueous solution of a metal salt containing an Ni salt as a main component and at least an Mn salt with an aqueous alkaline solution in the state of keeping a dissolved oxygen concentration at 5 mg/l or lower in the aqueous solution in reaction vessel, thereby growing a nickel oxide and then oxidizing the nickel oxide.

27. A method according to claim 26, wherein an inert gas and/or a reducing agent are continuously fed to the reaction vessel.

28. A method according to claim 27, wherein the inert gas is at least one gas selected from the group consisting of nitrogen, helium and argon.

29. A method according to claim 27, wherein hydrazine is used as the reducing agent.

30. A method according to claim 26, wherein an aqueous sodium hydroxide solution or an aqueous sodium hydroxide solution and an aqueous solution containing ammonium ion is used as the aqueous alkaline solution.

31. A method according to claim 26, wherein the oxidation is carried out by keeping the nickel oxide in air.

32. A method according to claim 31, wherein the nickel oxide is kept in air for at least 1 hour at 20–110° C.

33. A method according to claim 26, wherein the oxidation is carried out by reacting the nickel oxide with oxygen or an oxidizing agent.

34. A method according to claim 33, wherein the oxidizing agent is at least one agent selected from the group consisting of hydrogen peroxide and a perchlorate salt.

35. A method according to claim 26, wherein the pH value in the reaction vessel is 11–12.5.

36. A method according to claim 26, wherein the temperature in the reaction vessel is 20–60° C.

37. A method according to claim 26, wherein the aqueous solution is fed so that the feed rate of total metal ions contained in the aqueous solution of nickel salt is $2 \times 10^{-4}$ 14 $2 \times 10^{-2}$ mol/min.

38. An alkaline storage battery which comprises a nickel positive electrode, a negative electrode, an alkaline electrolyte and a separator, wherein an active material of the nickel positive electrode is a material obtained by a process as defined in claim 26.

* * * * *